US012778034B2

(12) United States Patent
Putkonen et al.

(10) Patent No.: US 12,778,034 B2
(45) Date of Patent: Nov. 3, 2026

(54) DETERMINING LOGGING MACHINE PRODUCT YIELD

(71) Applicant: Deere & Company, Moline, IL (US)

(72) Inventors: Aki Putkonen, Tampere (FI); Johannes Kaarnametsä, Pirkkala (FI); Vesa Siltanen, Tampere (FI); Vesa Leppänen, Katajaranta (FI)

(73) Assignee: DEERE & COMPANY, Moline, IL (US)

( * ) Notice: Subject to any disclaimer, the term of this patent is extended or adjusted under 35 U.S.C. 154(b) by 201 days.

(21) Appl. No.: 18/458,906

(22) Filed: Aug. 30, 2023

(65) Prior Publication Data

US 2024/0074365 A1 Mar. 7, 2024

(30) Foreign Application Priority Data

Sep. 1, 2022 (FI) ..................................... 20225768

(51) Int. Cl.
*A01G 23/08* (2006.01)
*G05B 17/02* (2006.01)

(52) U.S. Cl.
CPC ............. *A01G 23/08* (2013.01); *G05B 17/02* (2013.01)

(58) Field of Classification Search
CPC ................. G06Q 10/04; G06Q 10/047; G06Q 10/06312; G06Q 10/0637; G06Q 10/087;
(Continued)

(56) References Cited

U.S. PATENT DOCUMENTS

2007/0291994 A1* 12/2007 Kelle ..................... G01C 11/00
382/110
2019/0213691 A1* 7/2019 Kaarnametsä ....... G06Q 10/047
(Continued)

FOREIGN PATENT DOCUMENTS

EP 2133822 A1 12/2009
EP 3488686 A1 5/2019
(Continued)

OTHER PUBLICATIONS

Machine Translation of FI 20185171 A1 (Year: 2019).*
(Continued)

*Primary Examiner* — Scott A Browne
*Assistant Examiner* — Jisun Choi
(74) *Attorney, Agent, or Firm* — KLINTWORTH & ROZENBLAT LLP

(57) ABSTRACT

There is provided maintaining, at a network service operatively connected to a logging machine, master forest resource information, wherein the master forest resource information comprises prediction cells for product yield over a work area or a set of work areas, receiving, at the network service from the logging machine, logging machine measurements associated with the work area or the set of work areas, associating, at the network service, the received logging machine measurements to at least one prediction cell of the master forest resource information, determining, at the network service, based on the received logging machine measurements, a logging machine product yield for the work area or the set of work areas, modeling, at the network service, a difference between the logging machine product yield and a product yield of the at least one prediction cell, and compensating, at the network service, product yields of prediction cells based on the modeled difference.

9 Claims, 6 Drawing Sheets

(58) Field of Classification Search
CPC ...... G06Q 50/02; A01G 23/08; A01G 23/083; A01G 23/099
See application file for complete search history.

(56) References Cited

U.S. PATENT DOCUMENTS

| | | | | |
|---|---|---|---|---|
| 2019/0325669 | A1* | 10/2019 | Flood | G07C 5/02 |
| 2021/0248735 | A1 | 8/2021 | Edvardsson et al. | |
| 2022/0067600 | A1* | 3/2022 | Leppänen | G06Q 10/06 |
| 2024/0311734 | A1* | 9/2024 | Meier | G06Q 10/06375 |

FOREIGN PATENT DOCUMENTS

| | | | | |
|---|---|---|---|---|
| FI | 20185171 | A1 * | 8/2019 | |
| WO | WO-2016075641 | A1 * | 5/2016 | B07C 5/14 |
| WO | 2021225528 | A1 | 11/2021 | |

OTHER PUBLICATIONS

Finnish Patent and Registration Office Action and Search Report dated Mar. 10, 2023 for Finnish Application No. 20225768.
Skogforsk, StanForD 2010: Structural Descriptions and Implementation Recommendations Introduction to StanForD 2010, https://www.skogforsk.se/contentassets/1a68cdce4af1462ead048b7a5ef1cc06/stanford-2010-introduction-150826.pdf.
Tapio, Äijälä, O., Koistinen, A., Sved, J., Vanhatalo, K. & Väisänen, P. (toim.) 2019, Metsänhoidon suositukset, Tapion julkaisuja, ISBN 978-952-5632-75-0, published on the Internet May 31, 2019, www.metsanhoitosuositukset.fi.
Extended European Search Report dated Jan. 31, 2024 for European Application No. 23194738.3 (12 pages).
Kankare, Ville et al., “The prediction of single-tree biomass, logging recoveries and quality attributes with laser scanning techniques”, Dissertationes Forestales 195. 49p, Dept. of Forest Sciences, Faculty of Agriculture and Forestry University of Helsinki, May 2015, Available at http://dx.doi.org/10.14214/df.195. (49 pages).
Kemmerer, Julia et al., “Using harvester data from on-board computers: a review of key findings, opportunities and challenges”, European Journal of Forest Research (2021) 140:1-17, Published online Sep. 19, 2020, Available at https://doi.org/10.1007 /sl 0342-020-01313-4. (17 pages).

* cited by examiner

DETERMINING LOGGING MACHINE PRODUCT YIELD

CROSS-REFERENCE TO RELATED APPLICATION(S)

This application claims priority under 35 U.S.C. § 119 to Finland Application No. 20225768, filed Sep. 1, 2022 and entire contents of which are incorporated herein by reference.

STATEMENT OF FEDERALLY SPONSORED RESEARCH OR DEVELOPMENT

Not applicable.

FIELD OF THE DISCLOSURE

The present disclosure relates to determining logging machine product yield and more particularly to dynamically adjusting an estimate of the product yield.

BACKGROUND OF THE DISCLOSURE

Production volumes can be predicted using existing forest resource information that can be based on remote sensing such as LiDAR techniques. Data obtained by the remote sensing can be processed to determine tree species, volume of timber and a number of trees.

Modern logging machine produce information of production yield such as diameter of tree trunks, log length and harvested volume.

The existing forest resource information can become outdated in time at least because of differences in yearly growth of the forest. Also, the existing forest resource information can include errors.

Meeting production targets in harvesting can be compromised due to outdated or erroneous forest resource information. If a given harvester cannot complete its production target in a set time more time is needed for meeting the production targets. On the other hand if there is no more forest to be harvested at a current work area of the harvester, the harvester should be moved to a new work area, and the harvester is out of production during the transfer between the work areas. Extended driving time of the harvester increases production costs and time it takes to meet the production targets.

SUMMARY OF THE DISCLOSURE

The scope of protection sought for various embodiments of the disclosure is set out by the claims listed below. The embodiments, examples and features, if any, described in this specification that do not fall under the scope of the independent claims are to be interpreted as examples useful for understanding various embodiments of the invention.

In one aspect the disclosure provides a method comprising: maintaining, at a a network service operatively connected to a logging machine, master forest resource information, wherein the master forest resource information comprises prediction cells for product yield over a work area or a set of work areas; receiving, at the network service from the logging machine, logging machine measurements associated with the work area or the set of work areas; associating, at the network service, the received logging machine measurements to at least one prediction cell of the master forest resource information; determining, at the network service, based on the received logging machine measurements, a logging machine product yield for the work area or the set of work areas; modeling, at the network service, a difference between the logging machine product yield and a product yield of the at least one prediction cell; and compensating, at the network service, product yields of prediction cells based on the modeled difference.

At least some embodiments provide improved accuracy of determining logging machine product yield.

At least some embodiments provide improved control of logging operations.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

Figure 1:
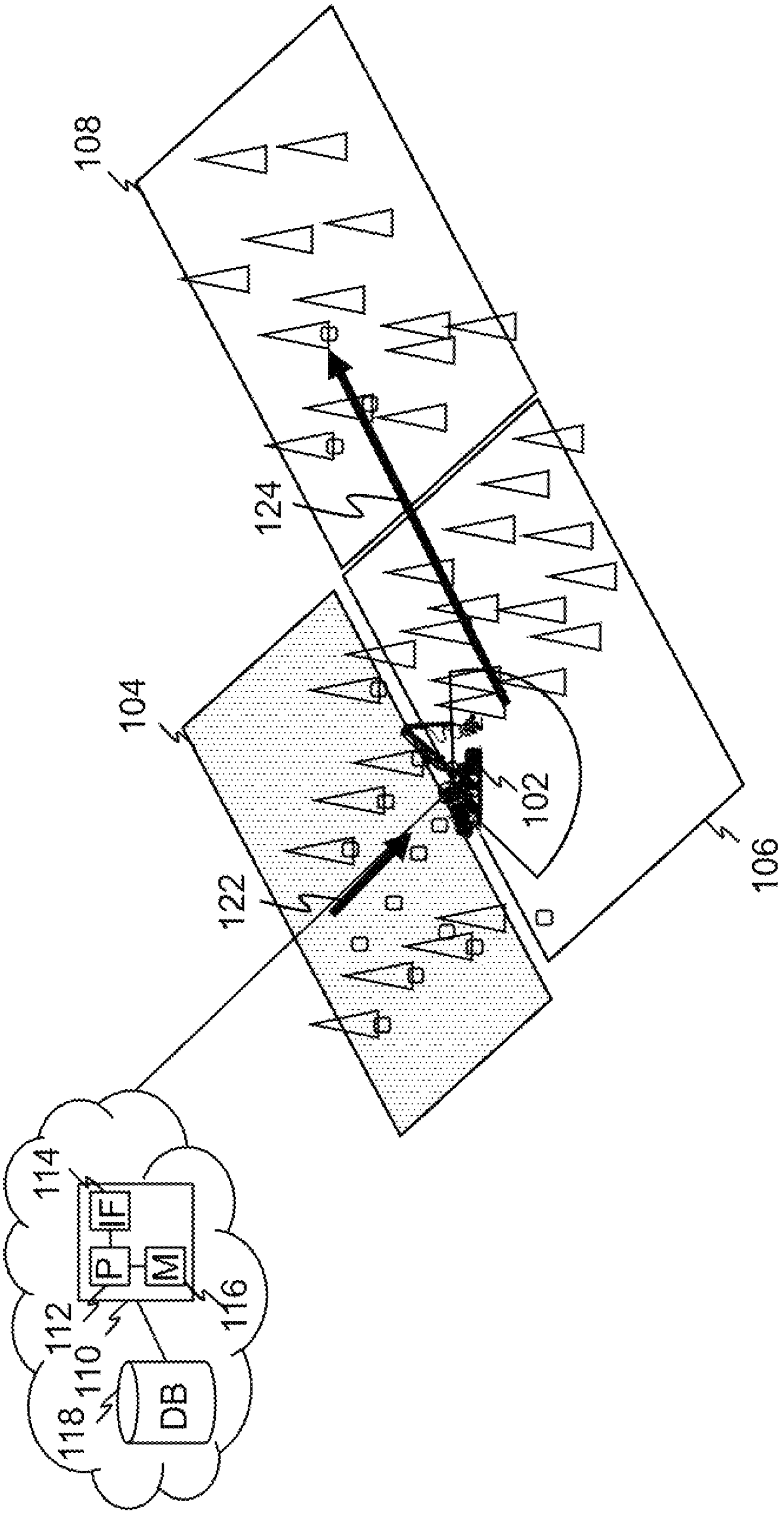
FIG. 1 illustrates an example of a system for managing logging operations based on predicted product yield accordance with at least some embodiments.

In the following description, reference is made to the accompanying drawings, which form part of the disclosure, and in which are shown, by way of illustration, specific aspects in which the present disclosure may be placed. It is understood that other aspects may be utilized, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

A work area may be forested soil for example moorland or grove. A logging machine, or harvester, may be operated at the work area or a set of work areas for production of products according to a target product assortment. The set of work areas may comprise neighboring work areas. The work areas are neighboring, at least when the logging machine may be driven from one work area to another without a need for transporting the logging machine between the work areas. Accordingly, when the logging machine is performing harvesting operations at one work area, the logging machine may continue the harvesting operations without interruption, e.g. by a need to transport the logging machine, to a neighboring work area. Therefore, a route plan a providing uninterrupted harvesting operations may be generated from one work area to a neighboring work area for the logging machine.

The work area may comprise one or more blocks of terrain. The blocks of terrain may be forested soil. The forested soil may comprise stand at one or more development categories. Examples of the development categories comprise A0, S0, T1, T2, Y1, 02, 03, 04, 05 and ER defined by Äijälä, O., Koistinen, A., Sved, J., Vanhatalo, K. & Väisänen, P. (toim.) 2019, Metsänhoidon suositukset, ISBN 978-952-5632-75-0, published on the Internet 31.5.2019. The development categories may be defined based on the age, structure and previous forest treatment of the stand.

Forest resource information comprises information of species of trees, a diameter of tree trunks, log length and stand volume of a forested soil at geographical locations. The forest resource information may be divided geographically into prediction cells. A prediction cell is structured data for controlling harvesting operations by a logging machine. The prediction cell comprises at least information indicating a predicted product yield of an area of forested soil and geographical positioning information associated with the predicted product yield. The information indicating a predicted product yield may comprise information of species of trees at the prediction cell, a diameter of tree trunks at the prediction cell, log length at the prediction cell and stand volume at the prediction cell. Each prediction cell may correspond, or model, a single tree at the area, whereby harvesting operations may be controlled at a level of individual trees. Accordingly, each prediction cell may be associated with a stump position, or tree position, whereby product yield of a logging machine at a given stump position, or tree position, may be associated with a prediction cell and a predicted product yield of the prediction cell. Master forest resource information comprises forest resource information that has sufficient quality for controlling harvesting operations. The quality may determined sufficient at least, when the master forest resource information comprises prediction cells. Accordingly, the prediction cells facilitate distinguishing between stand that can be used for producing one or more products of a target product assortment, and stand that cannot be used for producing one or more products of a target product assortment. The master resource information may therefore be used for making an initial production plan of the target product assortment. The initial target production plan may comprise one or more of: information defining a work area or a set of work areas for performing harvesting operations by the logging machine; a route of a logging machine and estimated working time; estimated production volumes of products; species of stand to be harvested; trunk diameters of each product to be harvested; trunk length of each product to be harvested; taper curve of each product to be harvested; control information for bucking. However, although the master forest resource information could be directly used for controlling harvesting operations by a logging machine, the master forest resource information may be outdated and/or comprise errors, whereby a likelihood that a harvester performing harvesting operations according to the master forest resource information would meet its production target may be low. At least some reasons for the low likelihood for meeting the production target comprise a long update interval of the master forest resource information, differences in yearly growth stand, positioning errors and differences between the predicted stand by the prediction cells and harvested product yield. In an example, the master resource information may be based on light detection and ranging (LiDAR) measurements. Measurement errors in LiDAR measurements may be caused at least when LiDAR measurements are performed in complex terrain by a ground-based LiDAR device, whereby inhomogeneity of wind speed in a horizontal plane may be generally high due to the curvature of the flow. Consequently, it may be impossible to avoid measurement errors when performing LiDAR measurements by a ground-based LiDAR device in such terrain. On the other hand LiDAR measurements may be made by an airborne LiDAR measurement device. Possible, error source for airborne LiDAR measurements comprise at least differences in shapes of tree trunks, ranging error, measuring angle error, location error, time synchronization error to name a few.

The work area may comprise one or more forest resource patterns, or cut blocks, that may be harvested by the logging machine. It should be noted that the work area may optionally also comprise one or more forest resource patterns, or growth blocks, that are not harvested. In an example the cut blocks may be in the development category 04 and the growth blocks may be in the development category A0. The a development category 04 is block, where the stand is ready to be harvested. The block may be determined to be in the development category 04 for example based on a number of trees/ha, diameters of the trees and tree lengths. On the other hand the development category A0 is a block that has been recently clear cut and there is at most 5 m2 of small-dimensioned stand at the block.

Logging machine, or a harvester, may be in general a work machine that is configured movable on forested soil and perform logging, or harvesting, for production of forestry products at a work area. The logging machine may comprise a harvester head for cutting and measuring stand for production of the forestry products according to a target product assortment. The logging machine may comprise measurement equipment for performing logging machine measurements. The logging machine measurements may comprise one or more of a position measurement of the logging machine, terrain speed measurement of the logging machine, load measurement of the logging machine, inclination measurement of the logging machine, measurement of production volumes according to assortment, measurement of trunk length, measurement of trunk diameter, measurement of limb size, measurement of taper curve, measurement of species, and measurement of product yield.

Product assortment may define an assortment of forestry products. The product assortment may be used at a logging machine for monitoring harvesting operations performed by the logging machine. In an example, the product assortment defines one or more products to be produced by the logging machine performing, when performing the harvesting operations. Each product may be defined based on one or more target parameters of the products. Examples of the target parameters comprise a diameter of trunk, trunk length, species of wood and production volume [m3].

FIG. 1 illustrates an example of a system for managing logging operations based on predicted product yield accordance with at least some embodiments. The system comprises one or more logging machines, or harvesters, 102 for performing harvesting operations at a work area 104, 106, 108 or a set of work areas. The logging machine may be configured to perform logging machine measurements at least during the harvesting operations, whereby the logging machine measurements may be associated with the work area or the set of work. In an example, results of the logging a machine measurements performed during the harvesting operations may comprise a position of the logging machine, a position of a harvesting head of the logging machine, terrain speed of the logging machine, load of the logging machine, inclination of the logging machine, production volume according to assortment at the work area and/or stump position, trunk lengths, trunk diameters, limb sizes, taper curves, species of trees at a work area and/or stump position, and product yield at a stump position.

The logging machine 102 may be operatively connected to a network service, or a backend system. The connection between the logging machine and the network service may be a data network connection. The data network connection may be an Internet Protocol (IP) connection, for example. The logging machine may comprise a communications module, for example a modem, for a wireless connection to a wireless communications network that provides the data network connection to the logging machine. The data network connection enables dividing functionalities described in various examples between the logging machine and the network service. The network service may be implemented as a cloud service which provides scalable allocation of resources of the functionalities as needed. The logging machine may be configured to implement a cloud service interface for utilizing the resources of the cloud for execution of functionalities and communications between applications at the logging machine and the cloud. Therefore, provided a sufficient throughput for data connection is available, a large portion of the functionalities described in examples herein may be executed at the network service, whereby a need for processing resources on-board the logging machine may be kept reasonable.

The network service may comprise at least one processor 112 and a communications unit (IF) 114, for example a transceiver. The processor is operatively connected to the communications unit for controlling the communications unit. The network service may comprise a memory 116. The memory may be operatively connected to the processor. It should be appreciated that the memory may be a separate memory or included to the processor and/or the transceiver. The memory may store instructions that, when executed by the at least one processor causes execution of one or more functionalities in accordance with a method described herein. It should be noted that the system may be implemented by a single logical entity or by networked logical entities. Each of the entities may be implemented by one or more physical devices or systems. In some examples, the network service may be connected to a database 118. The database may store master forest resource information. In some examples the network service 110 is implemented by a cloud computing system, whereby the communications unit comprises a cloud Application Programming Interface (API).

In an example of harvesting operation performed by the logging machine, the logging machine may harvest trees at the one or more work areas 104, 106, 108, where each work area may comprise one or more work positions of the logging machine. When the logging machine is located at a work position, its terrain speed is zero, and the logging machine may harvest one or more trees by a harvester head connected to the logging machine. The trees may be harvested automatically, or semi-automatically, by the logging machine. In an example of semi-automatic harvesting, an operator of the logging machine may assist in identifying species of the trees. The operator may enter a confirmation of a species of a tree via a user interface of the logging machine, whereby the harvesting of the tree may be controlled to according to one or more products defined for the confirmed species in a target product assortment. After harvesting at one work position, the logging machine may be moved to another work position at the same work area, or the logging machine may be moved to a neighboring work area 106.

In an example, the logging machine 102 may have a route 122 at a work area 104 and/or a route 124 over a set of work areas 106, 108. Within a single work area, the route may comprise a set of work positions of the logging machine. The logging machine may perform harvesting at each of the work positions and after harvesting at each of the work positions, the logging machine may be moved to a next work position. The logging machine performs logging machine measurements during the harvesting operation, whereby the logging machine measurements may be associated with positions of harvested trees, or stump positions. In this way a product yield may be determined for each stump position. However, the product yield determined during harvesting operations, e.g. product yield for a stump position, may be different than a predicted product yield e.g. for the stump position, whereby the predicted product yield a may need to be compensated for efficient harvesting by the logging machine and achieving the target product assortment in time. For example, if a predicted product yield for a stump position comprises a product yield X [m3] for "Product 1" and a product yield Y [m3] for "Product 2", but the product yield determined during harvesting operations for the stump position comprises less of "Product 1" in [m3] or no "Product 1" at all, the predicted product yield may need to be compensated.

Figure 2:
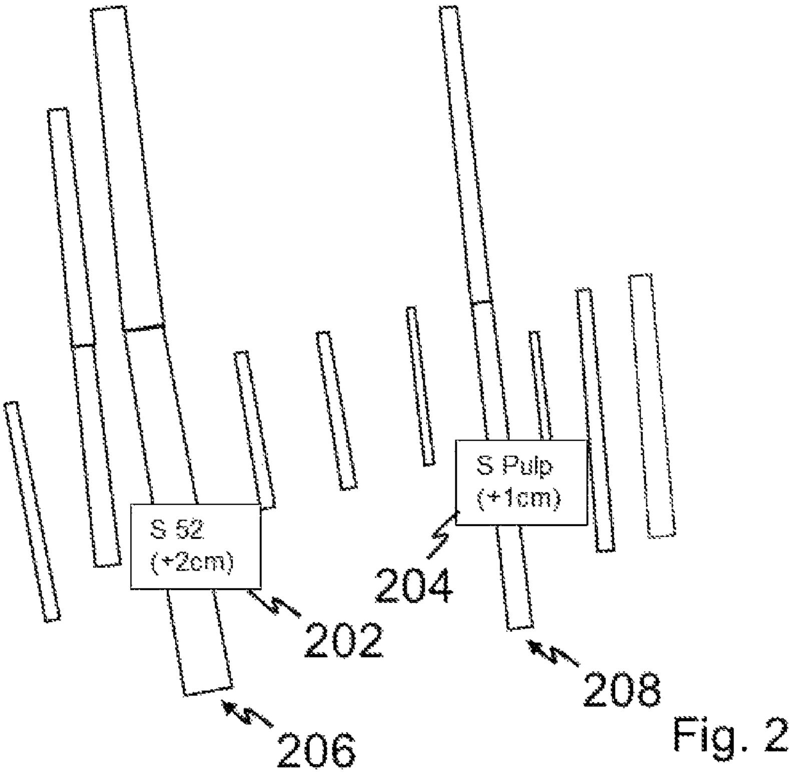
FIG. 2 illustrates a user interface for controlling logging according to production targets in accordance with at least some embodiments.

FIG. 2 illustrates a user interface for controlling logging according to production targets in accordance with at least some embodiments. The user interface may be provided at a user interface device operatively connected to a logging machine or a network service described with FIG. 1. An example of the user interface of the network service is a computing device, e.g. a mobile device such as a mobile phone, provided with a display.

The user interface comprises predicted product yields 202, 204 at a work position of the logging machine. The predicted product yields comprise product yields formed based on compensating predicted product yields. The product yields are shown for stump positions, or tree positions, 206 208 whereby the operator of the logging machine may determine which of the trees are harvested based on the displayed product yields in order to harvest products according to a target product assortment. For example, a first trunk portion, e.g. lowest log, of each tree is shown on the user interface together with information indicating a product of a target product assortment. Here the examples of the products comprise "S 52" and "S Pulp". Additionally, product yield estimates for the products at each stump position are displayed. Here the examples of the product yield estimates are +2 cm for "S 52" and +1 cm for "S Pulp". The product yield estimates indicate that the product yield estimates are higher than product yields determined by prediction cells of master forest resource information.

Figure 3:
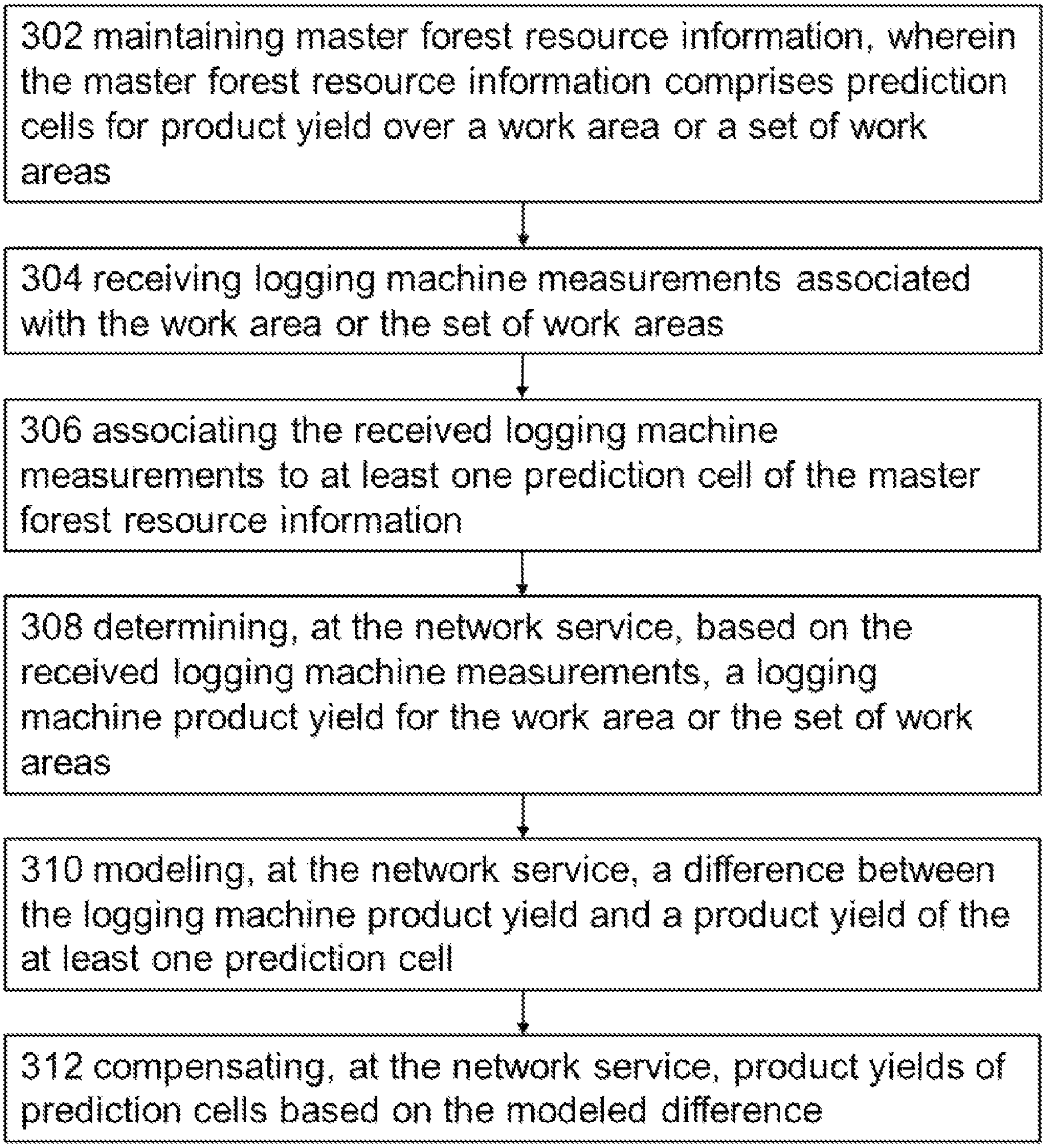
FIG. 3 illustrates a method for dynamically determining product yields during logging in accordance with at least some embodiments.

FIG. 3 illustrates a method for dynamically determining product yields during logging in accordance with at least some embodiments. The method may be performed by a system, device or entity that has access to master forest resource information and is capable of receiving logging machine measurements performed during harvesting operations. The method is described with reference to an example, where method is a performed by a network service described with FIG. 1. However, it should be noted that the method may be performed by the logging machine or some of the phases may be performed by the network service and some of the phases may be performed by the logging machine. The method may be performed during at least one harvesting operation, whereby an estimated product yield at a position, e.g. stump position, may be provided for supporting operations of the harvester and an operator of the harvester.

Phase 302 comprises maintaining, at a network service operatively connected to a logging machine, master forest resource information, wherein the master forest resource information comprises prediction cells for product yield over a work area or a set of work areas.

Phase 304 comprises receiving, at the network service from the logging machine, logging machine measurements associated with the work area or the set of work areas.

Phase 306 comprises associating, at the network service, the received logging machine measurements to at least one prediction cell of the master forest resource information.

Phase 308 comprises determining, at the network service, based on the received logging machine measurements, a logging machine product yield for the work area or the set of work areas.

Phase 310 comprises modeling, at the network service, a difference between the logging machine product yield and a product yield of the at least one prediction cell.

Phase 312 comprises compensating, at the network service, product yields of prediction cells based on the modeled difference.

Phase 312 comprises causing, by the network service, to control at least one harvesting operation of the logging machine based on the compensated product yields of prediction cells.

In an example, phase 306 comprises that position, where the logging machine measurements are made on the work area or the set of work areas is determined and the determined position is associated with the at least one prediction cell of the work area or the set of work areas. Accordingly, the association between the logging a machine measurements may be based on a level of match between their respective positions, or terrain locations, on the work area or the set of work areas. Alternatively, or additionally, the association between the logging machine measurements may be based on products of product assortment and/or tree species. For example, the association may be determined if products of product assortment, or product yields, of the logging machine measurements and the at least prediction cell match. For example, the association may be determined if tree species of the logging machine measurements and the at least prediction cell match.

In an example, phase 312 comprises that the at least one harvesting operation comprises controlling a position of a harvester head, controlling grasping performed by a harvester head, controlling felling performed by a harvester head or controlling processing performed by a harvester head. In an example, the harvester head may be connected to the logging machine by boom, whereby the position of the harvester head may be controlled by moving the boom and/or by moving, e.g. rotating, the harvester head with respect to the boom. In an example, the controlling a position of the harvester head may comprise that the harvester head is moved to a position, e.g. to a tree, that provides a target product yield. The harvester head may be moved to the position, when the logging machine is at a work position and the harvester head is moved to the position by a boom that connects the harvester head to the logging machine. The target product yield may be determined based on a total value of products at the position. The total value of products at the position may be determined e.g. based on a value matrix. The target product yield may be compared with a compensated product yield determined for the position, e.g. the position of the tree. In an example, the controlling grasping performed by a harvester head may comprise that the harvester head is controlled to grasp, fell, cut and/or process a tree at a given position, when a target product yield, e.g. a compensated product yield for a position of the tree meets the target product yield of for the position.

In an example, phase 312 comprises controlling the at least one harvesting operation of the logging machine based on bucking instructions. The bucking instructions may be adapted or generated based on the compensated product yields of prediction cells. The bucking instructions may control grasping, felling, cutting and/or a processing a tree at a given position. Therefore, the bucking instructions may control division of a tree stem to different qualities and dimensions of logs, veneer logs, pulpwood, or other harvest products. The bucking instructions may be sent to the logging machine by the network service. In an example the bucking instructions may comprise a value matrix and one or more values of an existing value matrix may be adapted/adjusted for controlling the at least one harvesting operation. The existing value matrix may comprise values determined based on prediction cells of a master forest information and the existing value matrix may be adapted based on the compensated product yields. In this way the existing value matrix may be dynamically adapted during harvesting operations based on the compensated product yields.

It should be noted that, a value of the value matrix defines a value, or weight, for extracting a product from a stump position. Therefore, it should not be treated only as a monetary value since the value reflects impact of the harvesting operation, e.g. extraction of tree, to remaining forest and/or production efficiency of the logging machine.

In an example, the value matrix may be used for determining one or more total values of products at a position of the work area or the set of work areas. A total value of products may be determined by fitting products to a stem of the tree at the position. It should be noted that each stem may be determined one or more, e.g. a plurality of, product fittings. Each product fitting may be determined a value based on the value matrix. One of the product fittings may be selected for controlling the at least one harvesting operation, whereby the products according to the selected product fitting may be produced by the at least one harvesting operation. The selection may be performed by an operator of the logging machine via a user interface of the logging machine or the selection may be based on software implemented logic executed by the logging machine. Preferably, the product fitting that has the highest total value of products is selected. In an example of the product fitting each stem may be cut into more than one product, e.g. logs of different diameters, logs of different lengths and pulpwood, each of which may have a value defined by the value matrix. In an example, the stem may be cut and processed by a harvester head into logs that have lengths according to the selected product fitting.

In an example, the bucking instructions may be in accordance with StanForD that is a Standard for Forest machine Data and Communication between computers in forest machines. The bucking instructions may define bucking of products defined based on product definitions accordance with StanForD. An example of the StanForD is provided by StanForD 2010. On page 17 of StanForD, FIG. 11 provides an example of the product definitions, where "Price" may be a value of a value matrix.

In an example, phase 312 comprises displaying at least one compensated product yield of the prediction cells on a user interface of the logging machine. In this way the user may be instructed about compensated product yields during at least one harvesting operation of the logging machine. In an example, the harvester head may be connected to the logging machine by boom, whereby the position of the harvester head may be controlled by moving the boom and/or by moving, e.g. rotating, the harvester head with respect to the boom. When the harvester head is at a position at the work area, where the position is associated with a compensated product yield of a prediction cell, the compensated product yield may be displayed on the user interface. In an example, the position may be determined to be associated with at least one compensated product yield of a prediction cell, when the harvester head is positioned at a prediction cell at the work area and one or more compensated product yields have been determined for one or more other prediction cells that are associated with the prediction cell in terms of one or more of: products of product assortment; tree species; and terrain locations. Then, one of the compensated product yields of the associated prediction cells or a statistical value, e.g. average, determined based on the compensated product yields of the associated prediction cells may be applied at the position of the harvester head and displayed on the user interface. In this way compensated product yields that have been determined during harvesting operations may be associated to a given position of the harvester head and the logging machine and/or the operator of the logging machine may be informed, whether the at least one harvesting operation should be continued, interrupted or if a user input is needed via the user interface.

In an example, if the user input is needed via the user interface, a message may be displayed on the user interface the message may indicate the operator of the a logging machine that his/her input is awaited. The message may be displayed in connection, e.g. at the same time, with displaying at least one compensated product yield of the prediction cells on the user interface. In this way the input form the user may be obtained with respect to operations, e.g. a harvesting operation, of the logging machine related to the compensated product yield. Provided the user input is received at the user interface, the at least one harvesting operation may be continued. In an example, the message displayed on the user interface may indicate that user input is needed for a tree species at the harvester head's position. If the user enters information indicating the tree species, harvesting a tree at the location of the harvester head may be continued provided the tree species is in accordance with a target product assortment. On the other hand, the user input from the user may cause interruption of the at least one harvesting operation. In an example, the user input may indicate a tree species that is not in accordance with a target product assortment, whereby the at least one harvesting operation shall not be applied to the tree at the position of the harvester head and the at least one harvesting operation may be interrupted. When the at least one harvesting operation is interrupted the harvesting head may be moved to another position at which a message may be displayed on the user interface the message may indicate the operator of the logging machine that his/her input is awaited, e.g. the operator may be queried for the tree species.

In an example, phase 310 comprises modeling the difference between the logging machine product yield and a product yield of the at least one prediction cell based on a linear model. Yield variables may have complicated relations with independent variables used. This means that a large number of observations, e.g. harvested trees, are needed to fit the best possible model shape. However, since the number of observations is small at one individual work area, it is wise to use prediction cell data, based on a large number of observations. However, the forest measurement errors often are spatially autocorrelated. For example, all trees on a given work area may have more taper and be shorter than the overall population in the region. This may be caused by high elevation and heavy wind conditions at the work area. A few trees measured by the logging machine on the work area can indicate this, while the overall relation used to produce the prediction cell measurements is valid. Therefore, on this individual work area, the prediction cell measurements are biased due to the wind-driven taper properties. When the difference is modeled, a linear model can be fit between the prediction cell measurements and the logging machine measurements, which facilitates correcting the product yield estimates of the prediction cells on this work area with a small number of local training data.

In another example, phase 310 comprises modeling the difference between the logging machine product yield and a product yield of the at least one prediction cell based on a non-parametric, nearest neighbor model. The prediction cell measurements may include the total volume. Non-parametric, nearest neighbor modeling may be applied to model the difference between the logging machine measured total volume and the total volume in the prediction cell measurements. The model may use the trees harvested inside some prediction cells and use the nearest neighbor approach to produce the model. This model may be used to summarize that 15% more timber is acquired from the work area than the prediction cell measurements had indicated. The harvester operator is informed on this so he can better predict the time to finish the job and the space needed for the wood pile on the roadside. He may also instruct the mill about the increased volume achieved from the operation.

In an example in accordance with at least some embodiments, phase 312 comprises sending, by the network service, information indicating the compensated product yields to the logging machine. In this way, if the compensated product yields are determined at the network service, the logging machine may be provided with the compensated product yields, whereby harvesting operations may be carried out at the logging machine using the compensated product yields. On the other hand, if the compensated product yields would be determined at the logging machine, the logging machine may send the information indicating the compensated product yields to the network service. Then at the network service, it may be determined, whether there is a need to update the master forest resource information and/or whether the information indicating the compensated product yields may be provided to one or more other logging machines that may be harvesting at work areas close to the logging machine that sent the information indicating the compensated product yields.

In an example in accordance with at least some embodiments, phase 312 comprises that the modeled difference between the logging machine product yield and a product yield of the at least one prediction cell is reduced.

In an example in accordance with at least some embodiments, phase 312 comprises generating, by the network service, a product yield estimate for the at least one prediction cell based on the modeled difference between the logging machine product yield and a product yield of the at least one prediction cell. The product yield estimate may be then used at the logging machine for controlling harvesting operations.

In an example in accordance with at least some embodiments, phase 312 comprises determining, one or more prediction cells that are associated with the at least one prediction cell in terms of one or more of: products of product assortment; tree species; and terrain locations. In this way prediction cells that may benefit from controlling harvesting operations based on the compensated product yield may be identified. In an example phase 312 comprises that the terrain locations may be stump positions. In an example phase 312 comprises compensating, at the network service, product yields of the associated one or more prediction cells based on the modeled difference. In an example, phase 312 comprises modeling, at the network service, a difference between product yields at stump positions of the logging machine and product yields at the prediction cells; and correcting, at the network service, a position of the logging machine based on the modeled difference. In an example, phase 312 comprises generating, by the network service, forest growth estimates for the associated one or more prediction cells based on the modeled difference between the logging machine product yield and the product yield of the at least one prediction cell. The forest growth estimate provides more accurate information for planning forest management measures.

In an example in accordance with at least some embodiments, phase 304 comprises that the logging machine measurements comprise one or more of: a position measurement of the logging machine; a position measurement of a harvesting head of the logging machine; terrain speed measurement of the logging machine; load measurement of the logging machine; inclination measurement of the logging machine; a measurement of production volumes according to assortment; measurement of trunk length; measurement of trunk diameter; measurement of limb size; measurement of taper curve; measurement of species of trees; product yield at a stump position.

In an example in accordance with at least some embodiments, phase 304 comprises that phase 302 comprises that the master forest resource information is based on LiDAR measurements. The LiDAR measurements may be obtained by an airborne LiDAR measurement device or a ground-based LiDAR device. The LiDAR measurements may be performed over an area of a forested soil. LiDAR data obtained by the LiDAR measurements may be used to form prediction cells at geographical positions of the forested soil.

Figure 4:
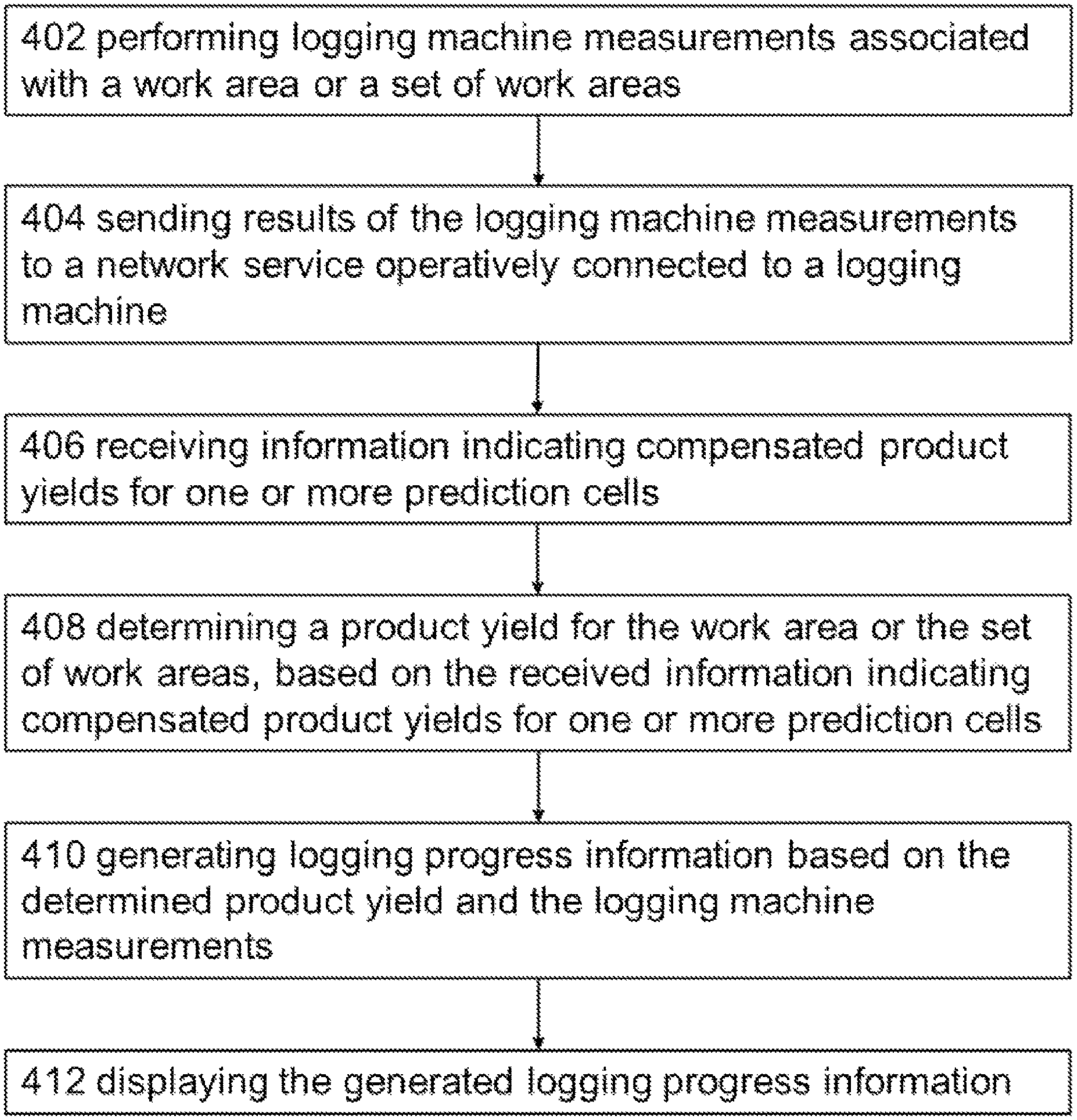
FIG. 4 illustrates a method for controlling logging according to product targets in accordance with at least some embodiments.

FIG. 4 illustrates a method for controlling logging according to product targets in accordance with at least some embodiments. The method may be performed by a device or entity that has access to logging machine measurements or capable of performing logging machine measurements during harvesting operations. The method is described with reference to an example, where method is performed by a logging machine described with FIG. 1. However, it should be noted that the method may be performed by a network service or some of the phases may be performed by the network service and some of the phases may be performed by the logging machine. The method may be performed during at least one harvesting operation, whereby an logging progress information may be provided for supporting operations of the harvester and an operator of the harvester.

Phase 402 comprises performing, by a logging machine, logging machine measurements associated with a work area or a set of work areas.

Phase 404 comprises sending, by the logging machine, results of the logging machine measurements to a network service operatively connected to a logging machine.

Phase 406 comprises receiving, by the logging machine from the network service, information indicating compensated product yields for one or more prediction cells.

Phase 408 comprises determining, by the logging machine, a product yield for the work area or the set of work areas, based on the received information indicating compensated product yields for one or more prediction cells.

Phase 410 comprises generating, by the logging machine, logging progress information based on the determined product yield and the logging machine measurements.

Phase 412 displaying, on a user interface of the logging machine, the generated logging progress information.

In an example, phase 402 comprises that a logging machine measurement comprises a product yield at a stump position.

In an example in accordance with at least some embodiments, phase 406 comprises causing, by the logging device, to control at least one harvesting operation of the logging machine based on the compensated product yields of the one or more prediction cells. In an example, the at least one harvesting operation comprises controlling a position of a harvester head, controlling grasping performed by a harvester head, controlling felling performed by a harvester head or controlling processing performed by a harvester head. In an example, the harvester head may be connected to the logging machine by boom, whereby the position of the harvester head may be controlled by moving the boom and/or by moving, e.g. rotating, the harvester head with respect to the boom. In an example, the controlling a position of the harvester head may comprise that the harvester head is moved to a position, e.g. to a tree, that provides a target product yield. The harvester head may be moved to the position, when the logging machine is at a work position and the harvester head is moved to the position by a boom that connects the harvester head to the logging machine. The target product yield may be determined based on a total value of products at the position. The target product yield may be compared with a compensated product yield determined for the position, e.g. the position of the tree. In an example, the controlling grasping performed by a harvester head may comprise that the harvester head is controlled to grasp, fell, cut and/or process a tree at a given position, when a target product yield, e.g. a compensated product yield for a position of the tree meets the target product yield of for the position.

In an example, in phase 406, the at least one harvesting operation of the a logging machine may be controlled based on bucking instructions. The bucking instructions may be adapted or generated based on the compensated product yields of prediction cells. The bucking instructions may control grasping, felling, cutting and/or processing a tree at a given position. In an example the bucking instructions may comprise a value matrix and one or more values of an existing value matrix may be adapted/adjusted for controlling the at least one harvesting operation. The existing value matrix may comprise values determined based on prediction cells of a master forest information and the existing value matrix may be adapted based on the compensated product yields. In this way the existing value matrix may be dynamically adapted during harvesting operations based on the compensated product yields. In an example, the value matrix may be used for determining one or more total values of products at a position of the work area or the set of work areas. A total value of products may be determined by fitting products to a stem of the tree at the position. It should be noted that each stem may be determined one or more, e.g. a plurality of, product fittings. Each product fitting may be determined a value based on the value matrix. One of the product fittings may be selected for controlling the at least one harvesting operation, whereby the products according to the selected product fitting may be produced by the at least one harvesting operation. Preferably, the product fitting that has the highest total value of products is selected. In an example of the product fitting each stem may be cut into more than one product, e.g. logs of different diameters, logs of different lengths and pulpwood, each of which may have a value defined by the value matrix. In an example, the stem may be cut and processed by a harvester head into logs that have lengths according to the selected product fitting.

In an example, the bucking instructions may be in accordance with StanForD that is a Standard for Forest machine Data and Communication between computers in forest machines. The bucking instructions may define bucking of products defined based on product definitions accordance with StanForD. An example of the StanForD is provided by StanForD 2010. On page 17 of StanForD, FIG. 11 provides an example of the product definitions, where "Price" may be a value of a value matrix.

In an example phase 410 comprises generating, by the logging machine, a a product yield estimate. The product yield estimate may be generated in accordance to described with phase 312 in FIG. 3. The product yield estimate may be then used at the logging machine for controlling harvesting operations.

In an example, phase 412 comprises displaying the generated at least one compensated product yield of the prediction cells on a user interface of the logging machine. In this way the user may be instructed about compensated product yields during at least one harvesting operation of the logging machine. In an example, the harvester head may be connected to the logging machine by boom, whereby the position of the harvester head may be controlled by moving the boom and/or by moving, e.g. rotating, the harvester head with respect to the boom. When the harvester head is at a position at the work area, where the position is associated with a compensated product yield of a prediction cell, the compensated product yield may be displayed on the user interface. In an example, the position may be determined to be associated with at least one compensated product yield of a prediction cell, when the harvester head is positioned at a prediction cell at the work area and one or more compensated product yields have been determined for one or more other prediction cells that are associated with the prediction cell in terms of one or more of: products of product assortment; tree species; and terrain locations. Then, one of the compensated product yields of the associated prediction cells or a statistical value, e.g. average, determined based on the compensated product yields of the associated prediction cells may be applied at the position of the harvester head and displayed on the user interface. In this way compensated product yields that have been determined during harvesting operations may be associated to a given position of the harvester head and the logging machine and/or the operator of the logging machine may be informed, whether the at least one harvesting operation should be continued, interrupted or if a user input is needed via the user interface.

In an example, if the user input is needed via the user interface, a message may be displayed on the user interface the message may indicate the operator of the logging machine that his/her input is awaited. The message may be displayed in connection, e.g. at the same time, with displaying at least one compensated product yield of the prediction cells on the user interface. In this way the input from the user a may be obtained with respect to operations, e.g. a harvesting operation, of the logging machine related to the compensated product yield. Provided the user input is received at the user interface, the at least one harvesting operation may be continued. In an example, the message displayed on the user interface may indicate that user input is needed for a tree species at the harvester head's position. If the user enters information indicating the tree species, harvesting a tree at the location of the harvester head may be continued provided the tree species is in accordance with a target product assortment. On the other hand, the user input from the user may cause interruption of the at least one harvesting operation. In an example, the user input may indicate a tree species that is not in accordance with a target product assortment, whereby the at least one harvesting operation shall not be applied to the tree at the position of the harvester head.

In an example in accordance with at least some embodiments, in phase 410 the logging progress information comprises total yield at a work position and/or at a stump position; product yield at a work position and/or at a stump position; number of trees to remove at a work position; height of a tree at a stump position; limb size; estimate of working time; route of the logging machine.

In an example in accordance with at least some embodiments, phase 412 comprises positioning the logging machine; positioning a harvester head of the logging machine; route planning for the logging machine; and/or a harvesting operation.

Figure 5:
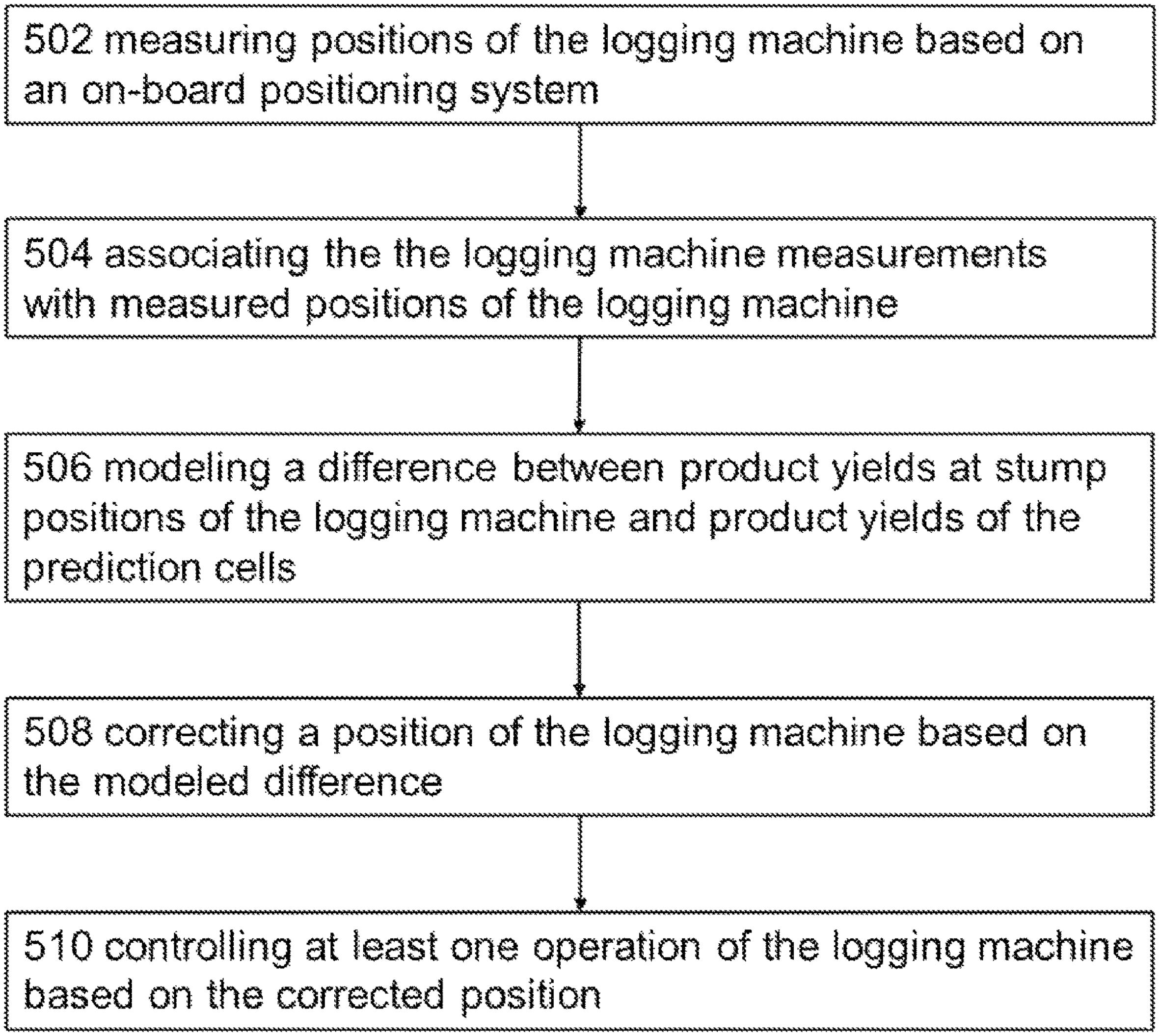
FIG. 5 illustrates a method for controlling logging according to product targets in accordance with at least some embodiments.

FIG. 5 illustrates a method for controlling logging according to product targets in accordance with at least some embodiments. The method may be performed by a device or entity that has access to positions of a logging machine or capable of measuring positions of the logging machine. The method is described with reference to an example, where method is performed by a logging machine described with FIG. 1. However, it should be noted that the method may be performed by a network service or some of the phases may be performed by the network service and some of the phases may be performed by the logging machine. The method may be performed during at least one harvesting operation, whereby corrected position of the logging machine may be obtained for supporting operations of the harvester and an operator of the harvester.

Phase 502 comprises measuring, at the logging machine, positions of the logging machine based on an on-board positioning system.

Phase 504 comprises associating, at the logging machine, the logging machine measurements with measured positions of the logging machine.

Phase 506 comprises modeling, at the logging machine, a difference between product yields at stump positions of the logging machine and product yields of the prediction cells.

Phase 508 comprises correcting, at the logging machine, a position of the logging machine based on the modeled difference.

Phase 510 comprises controlling, at the logging machine, at least one operation of the logging machine based on the corrected position.

Figure 6:
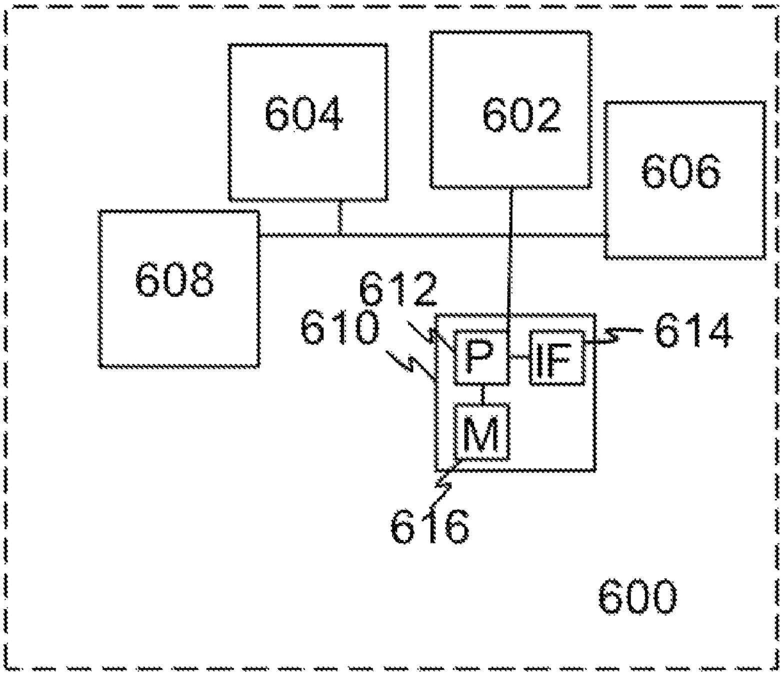
FIG. 6 illustrates a block diagram of a logging machine in accordance with at least some embodiments.

FIG. 6 illustrates a block diagram of a logging machine in accordance with at least some embodiments. The logging machine 600 may be a logging machine described with FIG. 1. The logging machine 600 may comprise at least one processor 612 operatively connected to measurement equipment for logging 602 and a communications unit (IF) 614, for example a transceiver. The logging machine comprises a memory 616 comprising instructions that when executed by the processor cause execution of one or more functionalities of a method in accordance with an example described herein.

In an example, in accordance with at least some embodiments, the logging machine comprises a bucking control 604 operatively connected to the processor. The bucking control may be operatively connected to a harvester head for causing one or more harvesting operations. The harvesting operations may be controlled by the bucking control based on bucking instructions. In this way products according to a target product assortment may be obtained. In an example, the bucking control may be configured to grasping tree trunks, felling trees and/or processing felled trees. The processing of felled trees may comprise one or more of delimbing a tree and cutting a tree trunk into logs.

In an example, in accordance with at least some embodiments, the logging machine comprises a drive control 606 operatively connected to the processor. In this way the logging machine may be configured to control movement of the logging a machine over one or more work areas. In an example, the movement may be controlled by causing the logging machine to drive forwards, backwards and by turning a driving direction of the logging machine.

In an example, in accordance with at least some embodiments, the logging machine comprises a user interface 608. The user interface may be on-board the logging machine and connected to the processors 612, and/or the user interface may be provided on mobile device such as a mobile phone connected to the logging machine e.g. via the communications interface 614. Examples of the user interfaces comprise user input devices for receiving user input such as commands, and user output devices for communicating information to operator of the logging machine visually or by audio. Examples of the user input devices comprise a joystick, a button and a keyboard. Examples of the user output devices comprise a display device and a speaker. A touch screen may serve for both user input device and a user output device.

In an example, the processor 612, memory 616 and communications unit 614 may be provided on a control module 610 of the logging machine.

Connections between the parts of the logging machine e.g. the measurement equipment 602, bucking control 604, drive control 606, user interface 608, memory 616, processor 612 and communications unit 614 may be provided data buses.

In accordance with at least some embodiments there is provided a computer program comprising instructions that when executed by a network service, cause execution of one or more functionalities of a method in accordance with an example described herein.

In accordance with at least some embodiments there is provided a computer program comprising instructions that when executed by a logging machine cause execution of one or more functionalities of a method in accordance with an example described herein.

Figure 7:
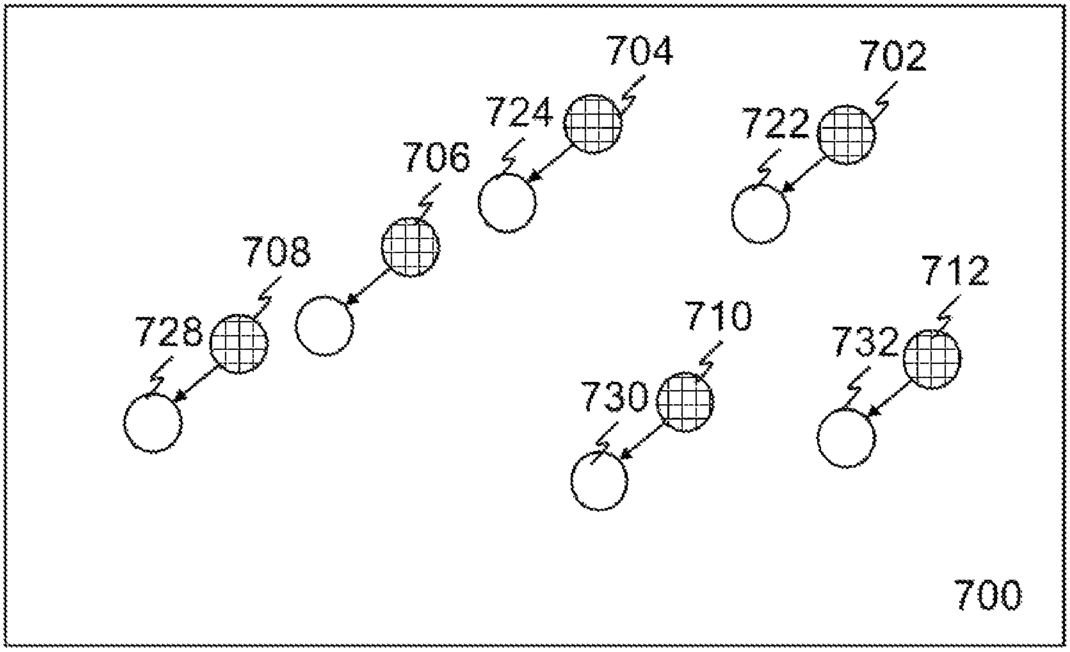
FIG. 7 illustrates an example of correcting a position of a logging machine based on a modeled difference between a logging machine product yield and product yields of prediction cells.

FIG. 7 illustrates an example of correcting a position of a logging machine based on a modeled difference between a logging machine product yield and product yields of prediction cells. The logging machine may have performed logging machine measurements at one or more stump positions 702, 704, 706, 708, 710, 712 at a work area. The stump positions may be illustrated on a user interface 700, e.g. on a display a device, of the logging machine. Each of the stump positions may be associated with a product yield. The product yields may have been measured by the logging machine and associated with position information, i.e. the stump positions. The stump positions may be determined by the logging machine e.g. by an onboard positioning system. Examples of the positioning systems comprise at least a Global Navigation Satellite System (GNSS). On the other hand, prediction cells 722, 724, 728, 730, 732 of master forest resource information may comprise prediction cells that each comprise a product yield, or predicted, product yield, associated with a geographical position. The geographical position may be positions of a forested soil. The position information of the prediction cells and the stump positions measured by the logging machine may have an error that may be detected and corrected. The error may be a systematic error or a variable error, when at least one of the errors is corrected, the positioning information of the prediction cells and the stump positions may be associated with each other more accurately. Alternatively or additionally, the correction of the error may be applied by the logging machine for controlling one or more harvesting operations.

In an example in accordance with at least some embodiments a method comprises that the logging machine measurements comprise one or more of:

- a position measurement of the logging machine;
- a position measurement of a harvesting head of the logging machine;
- terrain speed measurement of the logging machine;
- load measurement of the logging machine;
- inclination measurement of the logging machine;
- measurement of production volumes according to assortment;
- measurement of trunk length;
- measurement of trunk diameter;
- measurement of limb size;
- measurement of taper curve;
- measurement of species of trees; and
- measurement of product yield at a stump position.

In an example in accordance with at least some embodiments a method comprises modeling the difference between the logging machine product yield and a a product yield of the at least one prediction cell based on a non-parametric, nearest neighbor model.

In an example in accordance with at least some embodiments a method comprises that the logging progress information comprises at least one of:

- total yield at a work position and/or at a stump position;
- product yield at a work position and/or at a stump position;
- number of trees to remove at a work position;
- height of a tree at a stump position;
- limb size;
- estimate of working time;
- route of the logging machine.

In an example in accordance with at least some embodiments a method comprises that the bucking instructions may comprise a value matrix, and the method comprises:

adapting, at the logging machine, one or more values of the value matrix based on the compensated product yields;

determining, at the logging machine, one or more product fittings to a stem of a tree at a position of the work area or the set of work areas;

determining, at the logging machine, total values of the products for the determined one or more product fittings based on the value matrix;

selecting, at the logging machine, a product fitting that has the highest value from the determined one or more product fittings, for controlling the harvesting operation.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in a connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may a relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A method of controlling logging operations comprising:

maintaining, at a network service operatively connected to a logging machine, master forest resource information, wherein the master forest resource information comprises one or more prediction cells for product yield over a work area or a set of work areas wherein the one or more prediction cells are structured data for controlling harvesting operations by the logging machine and each of the one or more prediction cells comprises at least information indicating a predicted product yield of an area of forested soil and geographical positioning information associated with the predicted product yield, wherein the predicted product yield comprises one or more product yields of products of a forestry product assortment produced by harvesting the work area or the set of work areas by the logging machine, the forestry product assortment defining forestry products obtained from trees, including one or more of logs, veneer logs, pulpwood or other forestry products;

receiving, at the network service from the logging machine, logging machine measurements associated with the work area or the set of work areas, said logging machine measurements comprise product yield information at stump positions for one or more of the products of the product assortment;

associating, at the network service, the received logging machine measurements to at least one prediction cell of the master forest resource information;

determining, at the network service, based on the received logging machine measurements, a logging machine product yield for the work area or the set of work areas;

modeling, at the network service, a difference between the logging machine product yield and the predicted product yield of the at least one prediction cell;

determining, at the network service, one or more other prediction cells that are associated with the at least one prediction cell, the one or more other prediction cells corresponding to unharvested areas of forested soil;

compensating, at the network service, the predicted product yields of the associated one or more other prediction cells based on the modeled difference; and causing, by the network service, to control at least one harvesting operation of the logging machine such that, for a stump position corresponding to one of the associated one or more other prediction cells, the logging machine is controlled to harvest a stem of a tree into more than one forestry product of the forestry product assortment based on a total value of the forestry products of a selected product fitting to the stem at the stump position, the selected product fitting being determined using the compensated predicted product yields for the stump position.

2. The method of claim 1, comprising:

sending, by the network service, information indicating the compensated predicted product yields to the logging machine.

3. The method of claim 1, comprising:

generating, by the network service, a product yield estimate for the at least one prediction cell based on the modeled difference between the logging machine product yield and the predicted product yield of the at least one prediction cell.

4. The method of claim 1, wherein the determining of the one or more prediction cells that are associated with the at least one prediction cell is in terms of one or more of:

products of product assortment;

tree species; and terrain locations; and performing one or more of:

compensating, at the network service, the predicted product yields of the associated one or more prediction cells based on the modeled difference;

modeling, at the network service, a difference between product yields at stump positions of the logging machine and the predicted product yields of the prediction cells, and correcting, at the network service, a position of the logging machine based on the modeled difference; and generating, by the network service, forest growth estimates for the associated one or more prediction cells based on the modeled difference between the logging machine product yield and the predicted product yield of the at least one prediction cell.

5. The method of claim 1, wherein the at least one harvesting operation comprises controlling a position of a harvester head, controlling grasping performed by a harvester head, controlling felling performed by a harvester head or controlling processing performed by a harvester head.

6. The method of claim 1, comprising:

adapting or generating, at the network service, bucking instructions based on the compensated predicted product yields of prediction cells during an ongoing harvesting operation; and causing, at the network service, to control the at least one harvesting operation of the logging machine based on the adapted or generated bucking instructions.

7. The method of claim 6, wherein the bucking instructions may comprise a value matrix, and the method comprises:

adapting, at the network service, one or more values of the value matrix based on the compensated predicted product yields of the associated one or more other prediction cells during the ongoing harvesting operation;

determining, at the network service, one or more product fittings to a stem of a tree at a position comprising a stump position of the work area or the set of work areas, each product fitting specifying cutting the stem into more than one forestry product of the forestry product assortment;

determining, at the network service, total values of the products for the determined one or more product fittings based on the value matrix; and selecting, at the network service, a product fitting that has the highest value from the determined one or more product fittings, for controlling the at least one harvesting operation.

8. The method according to claim 1, comprising one or more of:

causing to display, by the network service, at least one compensated predicted product yield of the prediction cells on a user interface of the logging machine; and receiving user input from an operator of the logging machine via a user interface of the logging machine and causing to continue the at least one harvesting operation based on the user input or causing to interrupt the at least one harvesting operation based on the user input.

9. A network service for controlling logging operations, comprising at least one processor operatively connected to at least one data network interface for communications with one or more logging machines, and a memory comprising instructions that when executed by the processor cause:

maintaining, at a network service operatively connected to a logging machine, master forest resource information, wherein the master forest resource information comprises one or more prediction cells for product yield over a work area or a set of work areas, wherein the one or more prediction cells are structured data for controlling harvesting operations by the logging machine and each of the one or more prediction cells comprises at least information indicating a predicted product yield of an area of forested soil and geographical positioning information associated with the predicted product yield, wherein the predicted product yield comprises one or more product yields of products of a product assortment produced by harvesting the work area or the set of work areas by the logging machine, the forestry product assortment defining forestry products obtained from trees, including one or more of logs, veneer logs, pulpwood or other forestry products;

receiving, at the network service from the logging machine, logging machine measurements associated with the work area or the set of work areas, the logging machine measurements comprising product yield information at stump positions for one or more of the products of the forestry product assortment;

associating, at the network service, the received logging machine measurements to at least one prediction cell of the master forest resource information;

determining, at the network service, based on the received logging machine measurements, a logging machine product yield for the work area or the set of work areas;

modeling, at the network service, a difference between the logging machine product yield and the predicted product yield of the at least one prediction cell;

determining, at the network service, one or more other prediction cells that are associated with the at least one prediction cell, the one or more other prediction cells corresponding to unharvested areas of forested soil;

compensating, at the network service, the predicted product yields of the associated one or more other prediction cells based on the modeled difference; and causing, at the network service, control of at least one harvesting operation of the logging machine such that, for a stump position corresponding to one of the associated one or more other prediction cells, the logging machine is controlled to harvest a stem of a tree into more than one forestry product of the forestry product assortment based on a total value of the forestry products of a selected product fitting to the stem at the stump position, the selected product fitting being determined using the compensated predicted product yields for the stump position.

* * * * *